UNITED STATES PATENT OFFICE.

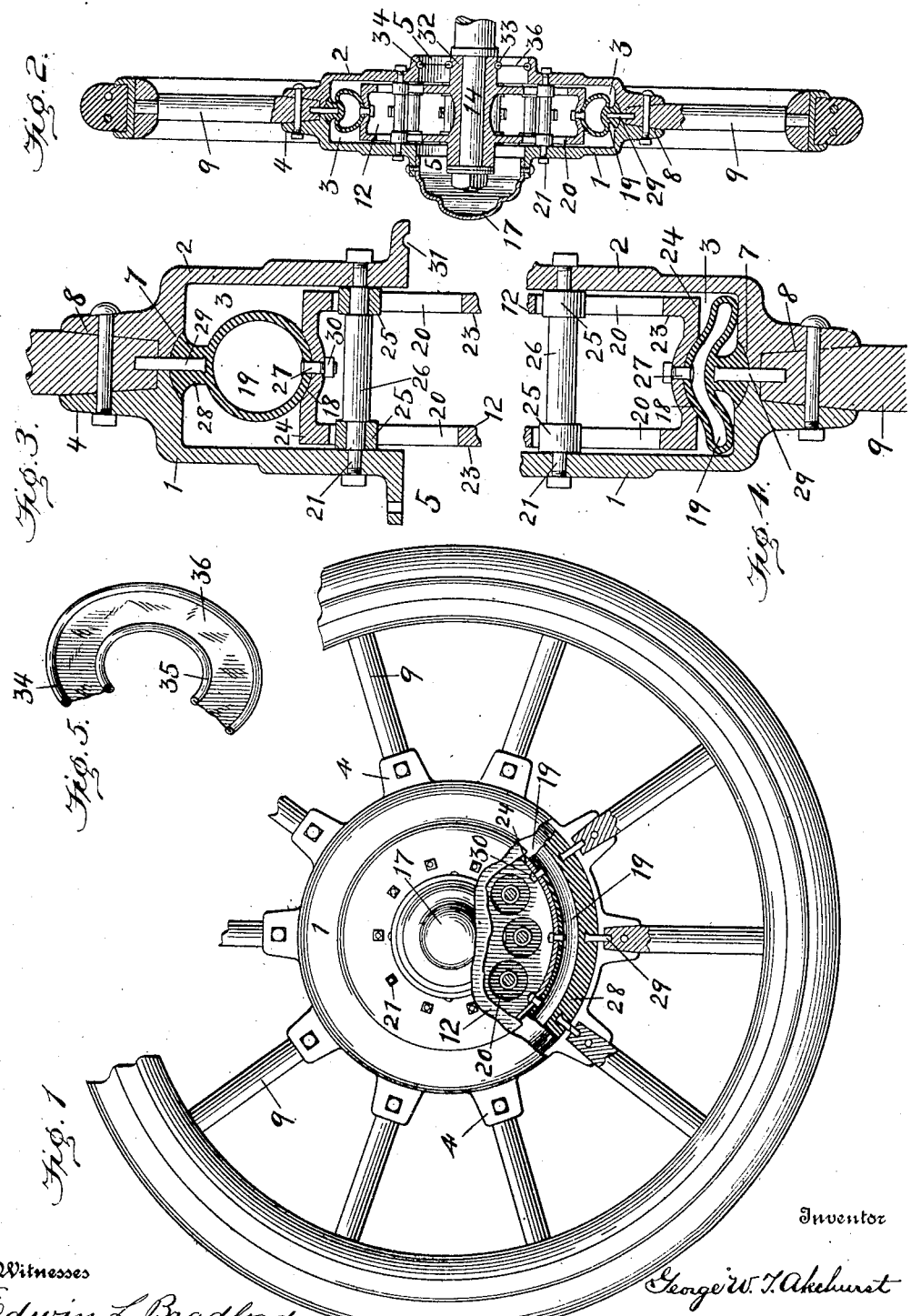

GEORGE W. T. AKEHURST, OF WHITE MARSH, MARYLAND.

VEHICLE-WHEEL.

No. 878,266.   Specification of Letters Patent.   Patented Feb. 4, 1908.

Application filed February 27, 1907. Serial No. 359,642.

*To all whom it may concern:*

Be it known that I, GEORGE W. T. AKEHURST, a citizen of the United States, residing at White Marsh, in the county of Baltimore and State of Maryland, have invented certain new and useful Improvements in Vehicle-Wheels, of which the following is a specification.

This invention relates to improvements in wheels in which the wheel-hub has a cushioned movement independent of the wheel structure.

The improved wheel is of similar character to that for which Letters Patent of the United States No. 827,494 was granted to me July 31, 1906 and the object of the present invention is to provide certain features of improvement which will hereinafter be particularly described.

Referring to the drawing, Figure 1 is a side elevation of a wheel with portions of the wheel broken away to show the internal construction. Fig. 2 is a diametrical cross-section through the wheel. Figs. 3 and 4 are sections on a larger scale of the hollow or chambered head and hollow-hub movable within the chamber. Fig 5 shows a broken perspective view on a larger scale of a dust-guard for the hub, which is seen in Fig. 2 on a smaller scale.

Referring to the drawing, a hollow metal head comprises two circular side-plates, 1, 2, which form a circular chamber, 3. These plates have a central opening, 5, and laterally-projecting flanges around said opening and the axle arm, 14, projects through said central opening. On the circumferential rim of the plates are projections, 4, having spoke sockets, 8, which project from the rim and receive the spokes, 9. The rim of the wheel may have any approved construction.

An improved hollow circular hub has position within the chamber, 3, this hub has two side walls, 23, and a circular rim wall, 24, which has a peripheral exterior groove, 18, around it, and a center bore for the axle arm. An annular channel, 7, is around the interior of the circular chamber, 3.

Both side walls of the hollow movable hub are provided with a number of circular openings, 20, arranged in a circle around the center bore wherein the axle-arm fits. Bolts, 21, extend from one outside circular plate, 1, to the other outside circular plate, 2, and these bolts pass freely through the opening, 20, in the hub; these openings are relatively very much larger than the said bolts, 21. Two friction rollers, 25, are on each bolt and the two rollers are separated by a sleeve, 26, also on the bolt. It will be seen that the friction rollers are in position where they may contact with the rim-edge of the circular opening, 20.

A special construction of pneumatic tube or ring, 19, is provided within the circular chamber, 3, and is interposed between the circular rim-wall, 24, of the hub and the circular wall of the chamber, 3. This pneumatic ring around its inner side is provided with a number of bolts, 27, projecting inward radially; these bolts are secured in the rubber wall of the tube at the time of vulcanizing. Around its outer rim the pneumatic ring has a thick circumferential flange, 28, and pins, 29, are secured in the said thick flange and project radially outward. The inner part of the pneumatic ring, 19, fits in the exterior groove, 18, around the hollow hub and the small bolts, 27, projecting inward from the said ring are secured to the rim wall, 24, of the hub by nuts, 30, on the bolts. These bolts secure the pneumatic ring to the movable hub, 12. The thick flange around the outer part of the ring fits in the annular channel, 7, and the pins, 29, projecting outward from said flange fit in holes in the two circular plates, 1, and, 2, as seen in Figs. 2, 3 and 4 and secure the pneumatic ring to the said plates and prevent any rotary slippage between the ring and plates.

By reference to Figs. 3 and 4, it will be seen that one side,—for instance the lower side,—of the ring may be collapsed or partly collapsed, while the diametrically opposite side of the ring will show having its full distention. This is due to a movement of the hollow hub, 12, within the chamber, 3. If such movement of the hub takes place suddenly—as when the wheel, while rapidly moving, strikes an obstruction in the road, the friction rollers, 25, on the bolts will contact with the edge of the circular openings, 20, and thereby a slight rotary movement of the hub occurs and a relief is afforded to the shock that follows striking the obstruction.

The opening on the outside of the wheel which gives access to the nut on the axle-arm, is closed by a cap, 17, as in the patent herein referred to, but on the inside of the wheel I now provide an improved dust guard to cover the said opening. This improved dust-guard is shown in Figs. 2 and 5. The central annular flange on the outside plate, 2, is provided with an inside annular groove, 31, and the movable hub, 12, which has a center bore for the axle-arm, also has a central boss, 32, on the side of the hub and this projecting boss has a surrounding groove, 33, which is in the same vertical plane as the inside groove, 31, on the plate, 2. The guard itself, shown in Fig. 5, consists of two flexible rings or hoops, 34, and, 35, the first one large enough to fit snugly in the inside groove, 31, and the last one smaller but of proper size to fit tightly in the groove around the central boss, 32. The two rings, 34, and, 35, are connected by means of an annular fabric, 36, of suitable material. This fabric allows a certain flexibility or yield of the two rings, that is of one ring relative to the other. It will be seen the flexible annular fabric, 36, closes the hub opening at the inside of the wheel around the axle, and serves as a dust guard.

Having thus described my invention what I claim as new and desire to secure by Letters Patent is,—

1. A vehicle wheel having a central chamber provided with an annular wall; a hollow hub in said chamber and having perforated side walls; bolts passing through the annular wall and also through the perforations in the side walls of the hollow hub; rollers on said bolts to contact with the circular walls of the perforations, and a cushioning means interposed between the hollow hub and the wall of the chamber.

2. A vehicle wheel having outside plates forming a chamber; a circular movable hub having two side walls and a hollow space between and fitted in said chamber and said walls provided with a series of circular openings, 20, arranged in a circle around the center of the hub; a bolt, 21, extending from one outside plate through a circular opening in the hub to the other outside plate; two friction rollers on each bolt to contact with the rim-edges of the circular openings in the hub, a sleeve, 26, on the bolt separating the two rollers and a cushioning means between the outside plate and circular hub.

In testimony whereof I affix my signature in presence of two witnesses.

GEORGE W. T. AKEHURST.

Witnesses:
CHARLES B. MANN, Jr.,
G. FERDINAND VOGT.